A. J. ABRAMS.
MUSIC SCORE FOR MOTION PICTURES.
APPLICATION FILED MAR. 23, 1921.

1,409,351.

Patented Mar. 14, 1922.
3 SHEETS—SHEET 1.

*Fig. 1.*

CHARLIE CHAPLIN

IN

THE KID

A FIRST NATIONAL PRODUCTION

Piano  AT SCREENING (Until first Scene appears)

NOTE MUSIC CHANGES ON ACTION

WATCH SCREEN

LOVE IS YOU

14 MINUTES
2 — (Action
Fade in Charity
Hospital.

Inventor:
Arthur J. Abrams
By Jno. G. Elliott Atty.

A. J. ABRAMS.
MUSIC SCORE FOR MOTION PICTURES.
APPLICATION FILED MAR. 23, 1921.

1,409,351.

Patented Mar. 14, 1922.
3 SHEETS—SHEET 2.

*Fig. 2.*

2 P   CHARLIE CHAPLIN IN THE KID 2 (ACTION) Fade in Charity Hospital.

Lento, ma non troppo.

NOTE MUSIC CHANGES ON TITLE
WATCH SCREEN

13 MIN.
14 MIN.

3 (TITLE)_____THE MAN

Inventor:
Arthur J. Abrams
By Jno. G. Elliott
Atty.

A. J. ABRAMS.
MUSIC SCORE FOR MOTION PICTURES.
APPLICATION FILED MAR. 23, 1921.

1,409,351.

Patented Mar. 14, 1922.
3 SHEETS—SHEET 3.

*Fig. 3.*

6
3  P  4  CHARLIE CHAPLIN in THE KID 21
3 (Title)..... THE MAN 22 (PICTURE FALLS FROM MANTEL

NOTE MUSIC CHANGES ON ACTION WATCH SCREEN

13 MIN.

23 (FADE OUT) PICTURE BURNING

14 MIN.

4-(Action)
(CHURCH)
PEOPLE IN FRONT.

Inventor:
Arthur J. Abrams
By Jno. T. Elliott
Atty.

UNITED STATES PATENT OFFICE.

ARTHUR J. ABRAMS, OF CHICAGO, ILLINOIS, ASSIGNOR OF ONE-FOURTH TO M. J. MINTZ, ONE-FOURTH TO CHARLES GREINERT, AND ONE-FOURTH TO WALTER ENGELS, ALL OF NEW YORK, N. Y.

MUSIC SCORE FOR MOTION PICTURES.

1,409,351.  Specification of Letters Patent.  Patented Mar. 14, 1922.

Application filed March 23, 1921. Serial No. 454,713.

*To all whom it may concern:*

Be it known that I, ARTHUR J. ABRAMS, a citizen of the United States, and a resident of the city of Chicago, in the county of Cook and State of Illinois, have invented certain new and useful Improvements in Music Scores for Motion Pictures, of which the following is a full, clear, and exact specification.

This invention relates to the playing of music as an accompaniment for motion pictures, the themes for the scores of which are selected from various numbers of music to harmonize and synchronize with the emotions expressed by the pictures and are arranged in the order of their playing in sheet music form, bound in as many books as there are instrumentations, which accompany the pictures and are distributed to the players for orchestration.

The object of my invention is to provide every sheet of such music with either an action cue or a title cue, and a timing cue imprinted thereon and so arranged with reference to the music thereof that the playing of the music for each scene may be continued throughout the display of the pictures therefor and will be stopped before the time for commencing the music for the next scene, without regard to the number of unplayed continuing bars of music for the first scene.

A further object of my invention is to provide each of the several pages of music with one or the other of two distinctive symbols, similar in form but differing in color, one for directing the attention of the players to the fact that the music being played changes with the next title; and the other, that the music changes on a specified action appearing on the screen, both of which symbols are accompanied with letters and words directing the players to watch the screen for the changes in action or title above referred to.

A further object of my invention is to have these symbols so arranged and located with reference to certain bars of the music on each page and the location of the timing cues therefor that the musician need but look at one spot, so to speak, on each page for accurately following the action cues, the title cues and the timing cues for harmonizing and synchronizing with motion pictures, the music on such page.

With these ends in view, my invention finds embodiment in certain features of novelty in the construction, combination and arrangement of parts by which the said objects are attained, all as hereinafter fully described with reference to the accompanying drawings and more particularly pointed out in the claims.

In said drawings,—

Fig. 1 illustrates the first of a number of bound or unbound sheets of music to be played for motion pictures in which my invention finds its embodiment, and which music, as directed thereon, is usually played with the beginning of the screening of the film of motion pictures until the first scene appears thereon.

Fig. 2 is a similar view of the next sheet or page of music, the playing of which commences with the display of the motion picture and continues throughout the playing of that particular picture with which it was selected to harmonize and synchronize; and Fig. 3 is a similar view of the page and sheet of music for the third scene of the motion pictures.

Similar characters of reference indicate the same parts and cues in the several figures of the drawing.

The music illustrated in the drawings is for piano instrumentation, printed upon a number of sheets arranged thereon in the order it is to be played, consecutively page numbered and preferably bound in book form, following the heretofore common practice, it being understood, however, that when for orchestral purposes, the sheet music for the several other instrumentations is bound in as many books as there may be instrumentations, for the protection thereof and for the convenience of its distribution to the players.

Upon the first and maybe every page of music is imprinted, as heretofore, a heading, 4, indicating the title of the motion picture for which the selections were made, to be played as an accompaniment therefor, which, in the present instance, is the filmed title "Charlie Chaplin in The Kid," for which the selections illustrated in the drawings were actually made to synchronize and harmonize, as nearly as may be, with the emotions indicated in the several scenes thereof.

Following the title are also imprinted the instrumentation 5 for the music, which, in the present instance, is a "piano"; and for the first page the numeral 1, (and as successive pages) is indicated at 6. On page 1 the cue 7 indicates when the playing of the music on page 1 is to commence, as indicated by the words, "At screening," meaning that the playing of the music on page 1 commences with the usual printed information preceding the appearance of the pictures on the screen, and also the time when the playing should cease, as indicated at 8; namely, until the first scene appears, and, in short, that the playing of the music on page 1, repeated or not, must cease the instant that the picture appears on the screen.

As shown in Fig. 1 of the drawings, the music thereon is provided with the usual signs, respectively 9 and 10—10, indicating that its playing is to be repeated, except as to the second and third measures of the last bar on the page, provided that 14 minutes is the time occupied by the screen until the first scene appears.

It, however, frequently occurs that the operators of motion picture projecting machines run their films faster than the printed matter thereon is photographed, as, for example, when following their taking in 14 minutes, the operator runs the films at 12 or 13 minutes, and hence it becomes necessary to provide some means for directing that, during the repeating of music, its playing should cease within the time actually occupied from the beginning of the screening until the first scene appears, for the preventing of the running of the music for one scene into that of another scene, and that the music for both scenes may commence and terminate at their proper time.

To these ends my invention provides for the use of two additional timing cues, the pointers for which disclose to the player that when, for example, the speed of the film throughout the screening and until the first scene appears is 12 minutes, then the playing of the repeat must cease with the beginning or ending, as may be, of a certain bar and which, in accordance with my invention, is indicated and accomplished by means of pointers 12 and 13, respectively located accordingly.

For example, when the player from observation knows or is advised by the operator that the screening is being run at the rate of 1,000 feet in 12 minutes or 13 minutes instead of 14 minutes, while being photographed, he knows by the pointers 11, 12, 13 and 14, the bar of music at which his repeat must accordingly cease to prevent the music selected for the screening from running into that selected for the first scene.

In addition to and supplementing these timing cues, my invention provides for locating between the shortest and longest timing cue, a symbol or pointer, preferably in the form of an arrow, on a panel 13 at the end of the shaft 14, on which are letters and words directing the player to "Note music changes on action," and on the shaft, in letters and words, the warning for the player, "Watch the screen," the head of the arrow being directed to the pointer 11 and also to cue No. 2, showing that the selection on the next and second page is to commence, as indicated at 15, with the appearance on the screen of an action, a "Fade in Charity Hospital"; that is to say, when there appears a fading-out in the first picture scene of a charity hospital appearing therein.

In short, after following the cue 7 for commencing the playing of the music on page 1, the player need but fasten his eyes during its playing, upon but a very small portion of the space of an entire sheet in order to follow any one of the time cues indicating and to know when to discontinue the playing of that music and know in advance of turning sheet 1, that when a certain action (15 for example) appears during the first scene of the motion pictures on the screen, (repeated on page 2,) he is to commence the playing of the music on page 2, which being a shorter piece, than that on page 1, need but have thereon the timing cues for 13 and 14 minutes, respectively indicated at 16 and 17, corresponding with the timing cues 13 and 11 on page 1.

On page 2 is also an indicator of the same form and arrangement relative to the music as that on page 1, consisting of an arrow on the stem 18, on which is a warning for the player, consisting of the letters and words, "Watch the screen," and on a panel 19, at the upper end of the stem, the letters and words for the player to "Note music changes on title," meaning that the playing of the selection of music on page 2 is to cease as soon as there appears on the screen the title or part of a title, consisting of the letters and words "The Man;" and in order that the player may know what this title will be in advance of its appearance on the screen, this cue is placed, together with the number of the page of the music and the letters and word "Title" below the music on page 2, as indicated at 20, and may be directly below the head of the arrow, as is the action title on sheet 1.

On page 3, below the name for the film pictures and above the music, there are repeated from page 2, as indicated at 6, the page, the title of the picture and at 21, the figure, letters and words "Numeral 3 (Title)—The Man," which latter two words is the cue for commencing the playing for the first part of music on that page.

There are also shown on page 3 two action cues, one of which, 22, consists of the letters and words,—"Picture falls from mantel," located between the first and second bars; the other, 23, consisting of the letters and words "(Fade out) picture burning," located between the second and third bars of the music on this page, the purpose of which cues is to indicate to the player that there has been a cut-out in the film at one or both of the points where the cues are located, and also to inform him whether or not his playing of these bars is in proper time for the picture.

It will now be seen that my invention provides for the use of printed sheet music for motion pictures and the imprinting on every sheet thereof of timing cues and either action or title cues, and in connection therewith a symbol grouping and connecting said several cues, whereby the eyes of the player are so fastened upon these several cues collectively, that he is enabled to retain them in his mind while playing the music, and thereby play the music in harmony and synchronism with the passing pictures.

My invention also provides, in connection with such cues and symbols, the use of guiding cues for cut-outs on any sheet of music when necessary for directing the attention of the player thereto, or for timing his music thereon to correspond with the pictures being exhibited at the time.

While for the purposes of uniformity in appearance of the several sheets of music, the symbols for the action and title cues have the same form and dimensions, and from which they respectively differ only in color, and have generally the form of an arrow with its point directed to such cues, my invention includes the use of symbols differing in form or size, without any difference in color, for differentiating between action cues and title cues, in the absence of any distinction in color, and this notwithstanding the arrowlike symbol shown in the drawings is the preferred form for the purposes of my invention.

In short, the essential feature of my invention, broadly speaking, is the use of any form or symbol adapted to provide a signboard, so to speak, differing either in form, size or color, for action and title cues, located in the immediate vicinity of and connecting the timing cues with and directly pointing to the action or timing cues therefor, as may be, imprinted upon a music sheet adjacent the last bar thereof, and thereby grouping said several cues in such a manner that the player is informed in advance of the title of the next piece of music and when to turn from the next preceding page of music thereto.

Having described my invention, what I claim and desire to secure by Letters Patent is:

1. A new and useful article of manufacture, consisting of a music score harmonizing with motion pictures, the several themes for which are arranged and printed consecutively upon a number of sheets in their playing order, with timing, action and title cues for synchronizing the music with the pictures, together with a symbol adapted to direct the attention and fasten the eyes of the player simultaneously upon said cues while playing the theme and themes for which such cues are provided.

2. A new and useful article of manufacture, consisting of a music score harmonizing with motion pictures, the several themes for which are arranged and printed consecutively upon a number of sheets in their playing order, with timing and action cues or else title cues on each sheet, together with a symbol imprinted thereon about which are grouped the timing and the action or else title cues.

3. A new and useful article of manufacture, consisting of a music score harmonizing with motion pictures, the several themes for which are arranged and printed upon a number of sheets consecutively in their playing order, with differing timing cues on each sheet, and an action or else a title cue, together with a symbol having associated therewith letters and words directing the player to watch the screen and note that the music changes with the action or title cue thereon as may be.

4. A new and useful article of manufacture, consisting of a music score adapted to harmonize with motion pictures, the several themes for which are arranged and consecutively printed upon a number of sheets paged in the order of their playing, together with a timing or else a title cue, and a symbol on each sheet adapted to direct attention to and fasten the eyes upon and fix in the mind of the player every such cue during his playing of the music on the page with which said cues are associated.

5. A new and useful article of manufacture, consisting of a music score selected to harmonize with motion pictures, the several themes for which are consecutively arranged and printed upon a number of sheets in their playing order, together with differential cues, an action or else title cues, and an arrowlike symbol on every sheet, the symbol for action cues being differentiated from that for the title cues.

6. A new and useful article of manufacture, consisting of a music score selected to harmonize with moving pictures, the several themes for which are consecutively printed in sheet music form upon a number of sheets, together with a plurality of differential timing cues, an action or else a title cue on each sheet, and a symbol on every sheet or numbered page about which said several cues are grouped for thereby directing the attention of the player to said several cues in such a manner as to fix them in his mind while playing the music for which said cues are provided.

7. A new and useful article of manufacture, consisting of a music score adapted to harmonize and synchronize with motion pictures, the several themes for which are arranged and printed consecutively and in the order of their playing upon a number of sheets, every sheet of which has imprinted thereon differential timing cues and either an action or title cue, and an arrowlike symbol differing in color for action and title cues, which symbol has imprinted thereon letters and words specifically directing the player to watch the screen and note that the music changes with the action or title cue, as may be, towards which the arrow is pointed, and whereby he is warned by the appearance on the screen of said action or title cue, as may be to turn his music and be in readiness to play the themes appearing upon another page.

In witness whereof, I have hereunto set my hand and affixed my seal, this 15th day of March, A. D. 1921.

ARTHUR J. ABRAMS. [L. S.]

Witnesses:
 JNO. G. ELLIOTT,
 H. SLACK.